Oct. 31, 1944.   J. A. GUYER ET AL   2,361,623
CATALYST CHAMBER
Filed April 16, 1943
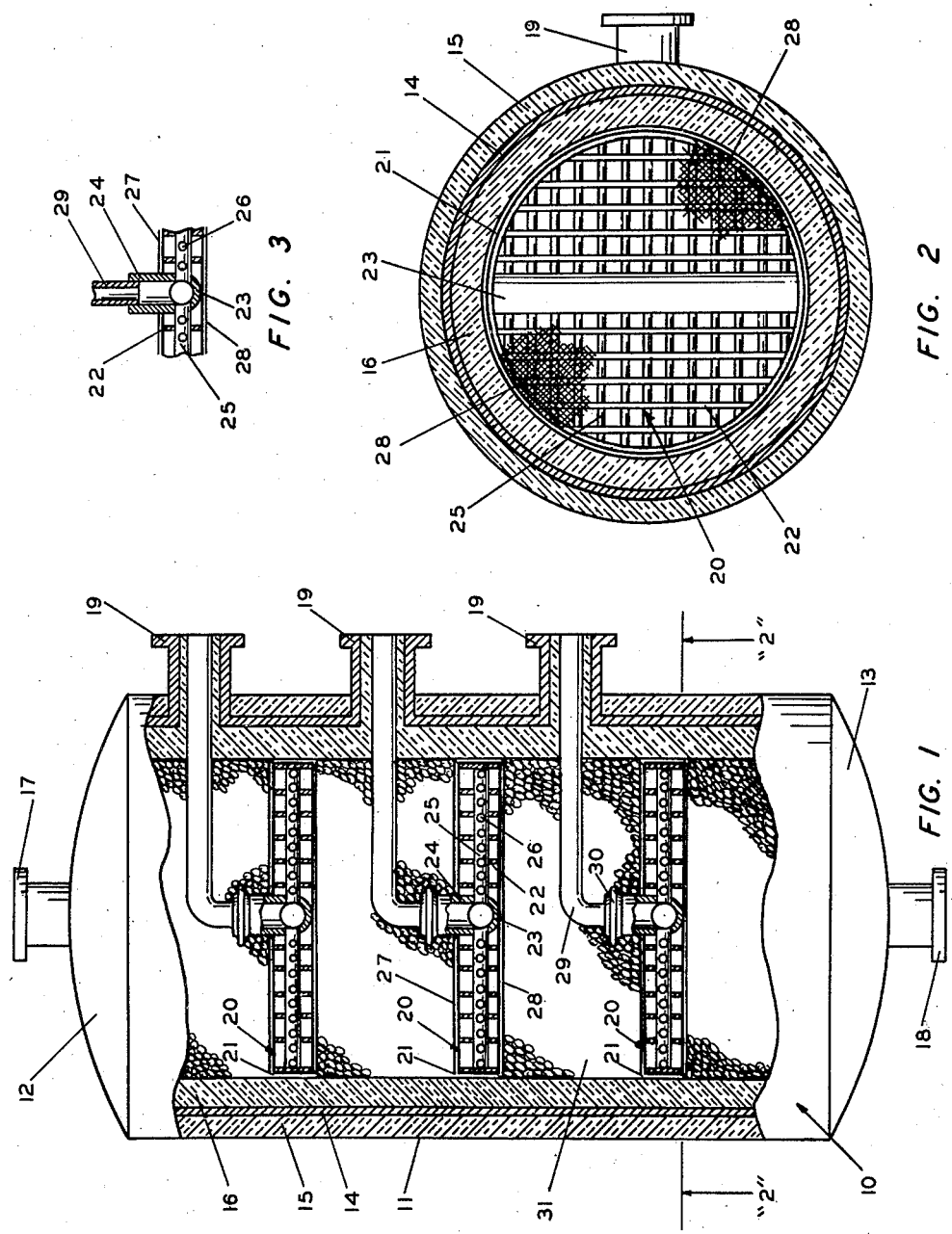
INVENTORS.
J. A. GUYER
L. G. MOLIQUE
C. J. HELMERS
BY Hudson, Young & Ginger
ATTORNEYS.

Patented Oct. 31, 1944

2,361,623

UNITED STATES PATENT OFFICE 2,361,623

CATALYST CHAMBER

Jesse A. Guyer, Lawrence G. Molique, and Carl J. Helmers, Bartlesville, Okla., assignors to Phillips Petroleum Company, a corporation of Delaware Application April 16, 1943, Serial No. 483,318

9 Claims. (Cl. 23—288)

This invention relates to a catalyst chamber of the class employed in carrying out hydrocarbon conversions in the presence of solid catalytic material. It is particularly concerned with catalyst chambers of the character indicated wherein a plurality of beds of solid catalyst is disposed with the beds arranged one above the other.

Catalyst vessels are of particular utility in the catalytic conversion of hydrocarbon oils, especially in the cracking of said oils, to facilitate direct heat transfer and temperature control within the catalyst mass. Thus in the catalytic cracking of hydrocarbon oils, it is usually desirable to supply heat to vapors of said oils undergoing treatment during the conversion period and to remove heat developed in the course of the exothermic reactivation of the catalyst by combustion of the carbon deposited thereon. One of the most serious problems encountered in catalytic conversions is that of thermal expansion of mechanical items of equipment that are exposed to the elevated temperatures necessary to the procedure. It is important that suitable means be provided to properly compensate for thermal expansion, otherwise deformation or dislocation of components of the apparatus might occur with resultant failures in normal operations. The practice of the present invention successfully compensates for such thermal expansion as will be apparent from the ensuing detailed discussion. Moreover, our invention is adapted to perform its intended functions in an efficient and effective manner and in the absence of various difficulties experienced heretofore in the use of other types of catalyst chambers.

It has been found desirable to arrange the catalyst in several separate beds, so that diluent vapors may be distributed between the beds during the conversion cycle to control the temperature. This permits the hydrocarbon vapors to be effectively distributed and decreases the tendency of the vapors to channel. The several catalyst beds likewise permit the entire catalyst mass to be regenerated simultaneously by the intermediate injection of regenerative gases or vapors.

It is the primary object of this invention to provide an improved catalyst chamber for converting hydrocarbons in an efficient and effective manner.

An important object of this invention is to properly compensate for thermal expansion of mechanical parts that are exposed to the relatively high temperatures usually encountered in the course of catalytic conversion operations and the subsequent regeneration of the catalyst material.

Another important object of the invention is to provide apparatus of the character indicated which is simple in design, rugged in construction, and reasonable in initial, operating and maintenance costs.

These as well as other objects and advantages will be readily apparent to persons skilled in the art by reference to the following description and annexed drawing, which respectively describe and illustrate preferred embodiments of the invention, and wherein Figure 1 is an elevation view of our catalyst chamber partly in central cross section;

Figure 2 is a cross sectional view taken along line 2—2 of Figure 1; and

Figure 3 is a modification of a portion of the equipment depicted in Figure 1.

Referring first to Figure 1 of the drawing, we have illustrated a catalyst chamber, generally indicated by reference numeral 10, and including a vertical cylindrical side wall 11, a top wall 12, and a bottom wall 13. The walls of the catalyst chamber are made from plate or sheet metal 14 of necessary thickness and composition to withstand the conditions encountered therein in the course of normal operation. The outer surface of the metal chamber is provided with a covering of insulation 15 that may be of the asbestos type, while the inner surface carries a suitable sheath of refractory insulation 16. The hydrocarbon feed stock to be processed within the chamber 10 is preferably introduced thereinto through an inlet 17 and the conversion products are discharged from the chamber by way of an outlet 18. A plurality of vertically spaced inlets 19 are provided in side wall 11 for the admission of suitable diluent into the chamber, whereby the temperature developed in the chamber in the course of normal use may be controlled within a predetermined range.

A plurality of spaced circular hollow partitions 20 is positioned within the chamber. These partitions divide the interior of the chamber into a series of compartments, each of which is filled with a bed of solid catalyst material 31 of selected composition and size. Partitions 20 are somewhat smaller in overall diameter than the internal diameter of the chamber, thereby providing a clearance space 21 to allow for vertical movement of the individual partitions within the chamber. Each partition includes a grating 22 within which there is a hollow spider arrangement consisting of a header 23 having an inlet 24 and a plurality of branch lines or distribution conduits 25, each of which is provided with a series of ports 26. Metallic screens 27 and 28 are provided on the top and bottom, respectively, of each partition. These screens are co-extensive with the top and bottom of the partitions and have a mesh of such size as to permit the passage of fluid material therethrough but preventing the passage of catalyst material from an upper partition to the next lower partition. It will be observed that each partition rests on the catalyst bed therebelow, thereby eliminating the need of mechanical supports. A conduit 29 establishes communication between corresponding diulent inlet 19 and spider inlet 24 through a flexible connection such as bellows 30. Upon expansion of the elements of equipment within chamber 10 due to temperature increases therein, bellows 30 permits relative movement between partitions 20 and conduits 29.

Figure 3 illustrates a form of flexible connection that may be used in place of the bellows 30 shown in Figure 1. This consists of a slip joint formed between the lower end of conduit 29 and the upper end of inlet 24 whereby said end of conduct 29 is telescopically disposed within inlet 24. If desired, the relative position of these two elements may be reversed, that is, inlet 24 may be telescopically disposed within the lower end of conduit 29.

From the foregoing it is believed that the construction, operation and advantages of our instant invention will be readily comprehended by persons skilled in the art. It is to be clearly understood, however, that various changes in the apparatus may be resorted to without departing from the spirit of the invention as defined by the appended claims.

We claim:

1. In a catalyst chamber having an inlet, an outlet and means for admitting treating fluid thereinto, the improvement comprising a hollow partition disposed within the chamber intermediate the ends thereof, said partition being perforated to permit the flow of fluid material while preventing the passage of solid material greater than a predetermined size therethrough; fluid spray means comprising a spray inlet, a plurality of tubular members positioned within the partition and communicating with the spray inlet, and a plurality of spaced spray outlets in each of the tubular members; a conduit adapted to communicate at one end with the first mentioned means; and a flexible connection establishing communication between the other end of the conduit and the spray inlet to thereby allow relative movement between the partition and the conduit.

2. The improvement as in claim 1 wherein the flexible connection comprises a bellows.

3. The improvement as in claim 1 wherein the flexible connection comprises a slip joint.

4. In a catalyst chamber having a substantially cylindrical vertical side wall, end walls, an inlet in one end wall and an outlet in the other end wall, the improvement comprising a hollow partition adapted to be disposed within the chamber intermediate the end walls and spaced from the inner surface of the side wall, said partition including a pair of spaced fixedly disposed perforate members for permitting the flow of fluid material and for preventing the passage of solid material greater than a predetermined size therethrough; fluid spray means comprising a spray inlet, a plurality of tubular members positioned between the perforate members and communicating with the spray inlet, and a plurality of spaced outlets in each tubular member; a conduit within the chamber, one end of the conduit being adapted to communicate with the exterior of the chamber; and a flexible connection establishing communication between the other end of the conduit and the spray inlet to thereby allow relative movement between the partition and the conduit.

5. The improvement as in claim 4 wherein the flexible connection comprises a bellows.

6. The improvement in claim 4 wherein the flexible connection comprises a slip joint.

7. In a catalyst chamber having a substantially cylindrical vertical side wall, end walls, an inlet in one end wall and an outlet in the other end wall, the improvement comprising a hollow partition adapted to be disposed across the chamber intermediate the ends walls and spaced from the inner surface of the side wall, said partition including a grating having openings therein establishing communication between the portions of the chamber thereabove and therebelow, a perforate member above the grating and a perforate member below the grating for permitting the flow of fluid material and for preventing the passage of solid material greater than a predetermined size through the partition; fluid spray means fixedly positioned between the perforate members and including a spray header, a plurality of distribution conduits communicating with the spray header and extending outwardly thereof, and a plurality of ports in each distribution conduit communicating with the interior thereof and the openings in the grating; a fluid supply conduit within the chamber, one end of the supply conduit being adapted to communicate with the exterior of the chamber; and a flexible connection establishing communication between the other end of the supply conduit and the spray header to thereby allow relative movement between the partition and the supply conduit.

8. The improvement as in claim 7 wherein the flexible connection comprises a bellows.

9. The improvement as in claim 7 wherein the flexible connection comprises a slip joint.

JESSE A. GUYER.
LAWRENCE G. MOLIQUE.
CARL J. HELMERS.